(12) United States Patent
Griffin et al.

(10) Patent No.: US 8,780,046 B2
(45) Date of Patent: Jul. 15, 2014

(54) DEVICE AND METHOD FOR APPLICATION NAVIGATION ENHANCEMENT ON A HANDHELD ELECTRONIC DEVICE

(75) Inventors: Jason T. Griffin, Kitchener (CA); Steven Fyke, Waterloo (CA)

(73) Assignee: BlackBerry Limited, Waterloo (CA)

( * ) Notice: Subject to any disclaimer, the term of this patent is extended or adjusted under 35 U.S.C. 154(b) by 1408 days.

(21) Appl. No.: 11/852,657

(22) Filed: Sep. 10, 2007

(65) Prior Publication Data

US 2009/0066651 A1   Mar. 12, 2009

(51) Int. Cl.
*G09G 5/08* (2006.01)

(52) U.S. Cl.
USPC ............................................ 345/167; 345/169

(58) Field of Classification Search
USPC ................................. 345/161–169, 173–180; 178/18.01–18.07, 19.01–19.06
See application file for complete search history.

(56) References Cited

U.S. PATENT DOCUMENTS

| | | | |
|---|---|---|---|
| 6,320,569 B1 * | 11/2001 | Kinman ........................ | 345/167 |
| 7,489,302 B2 * | 2/2009 | Moosavi et al. .............. | 345/168 |
| 7,605,801 B1 * | 10/2009 | Sharp ............................ | 345/161 |
| 2008/0055253 A1 * | 3/2008 | Moosavi et al. .............. | 345/169 |

FOREIGN PATENT DOCUMENTS

| | | |
|---|---|---|
| EP | 1437640 A | 7/2004 |
| EP | 1473621 A | 11/2004 |
| EP | 1524821 A | 4/2005 |
| GB | 2355143 A | 4/2001 |
| WO | 0127734 | 4/2001 |
| WO | 03/071377 A | 8/2003 |

OTHER PUBLICATIONS

European Search Report 07116042.8; Dec. 28, 2007.
Examination Report mailed Nov. 25, 2009, in corresponding application No. 07116042.8.
Canadian Office Action mailed Jan. 27, 2011, in corresponding application No. 2639373.
Office Action mailed Jun. 5, 2012, in corresponding Canadian patent application No. 2,639,373.

* cited by examiner

*Primary Examiner* — Vijay Shankar
(74) *Attorney, Agent, or Firm* — Novak Druce Connolly Bove + Quigg LLP (57) ABSTRACT

A handheld electronic device with a body which houses a microprocessor-run software application is disclosed. The software application program requires operator navigation therein during use. Furthermore, the application program is programmed to receive a directional navigation instruction from the operator utilizing a navigation tool. The instruction indicates a direction and degree of navigation with the application program. The application program is further programmed to receive a complimentary instruction from the operator that adapts the instructed degree of navigation to be affected in the application program by the received directional navigation instruction.

17 Claims, 11 Drawing Sheets

DEVICE AND METHOD FOR APPLICATION NAVIGATION ENHANCEMENT ON A HANDHELD ELECTRONIC DEVICE

FIELD

This disclosure, in a broad sense, is directed toward a handheld communication device that has wireless communication capabilities and the networks within which the wireless communication device operates. The present disclosure further relates to enhancement of navigation control within an application running on a handheld electronic device.

BACKGROUND

With the proliferation of wireless communication systems, compatible handheld communication devices are becoming more prevalent, as well as advanced. Whereas in the past such handheld communication devices were typically limited to either voice transmission (cell phones) or text transmission (pagers and PDAs), today's consumer often demands a multifunctional device capable of performing both types of transmissions, including even sending and receiving e-mail. Furthermore, these higher-performance devices can also be capable of sending and receiving other types of data including that which allows the viewing and use of Internet websites. These higher level functionalities necessarily require greater user interaction with the devices through included user interfaces (UIs) which may have originally been designed to accommodate making and receiving telephone calls and sending messages over a related Short Messaging Service (SMS). As might be expected, suppliers of such mobile communication devices and the related service providers are anxious to meet these customer requirements, but the demands of these more advanced functionalities have in many circumstances rendered the traditional user interfaces unsatisfactory, a situation that has caused designers to have to improve the UIs through which users input information and control these sophisticated operations.

Keyboards are used on many handheld devices, including telephones and mobile communication devices. The size of keyboards has been reduced over the years, as newer, smaller devices have become popular. Cell phones, for example, are now sized to fit in one's pocket or the palm of the hand. As the size of the devices has decreased, the more important it has become to utilize the entire keyboard surface as efficiently as possible.

Many keyboards on mobile devices have an input device for navigation through the graphical user interface. These interfaces include such devices as trackballs and rotating wheels which can be used to effect movement of a cursor or pointer, or to scroll up, down and about a displayed page. These navigation devices often occupy a relatively large amount of space on the incorporating mobile device. Because the navigation device is frequently used and often requires fine control, a lower end size limitation will normally be observed by device designers. To accommodate such larger, more convenient navigation devices on the housing of the mobile device, the amount of space that is available for the keys of the keyboard is correspondingly reduced if the keyboard and navigation device are proximately located to one another.

As users rely more heavily on their handheld electronic devices, users demand that the devices operate easily and intuitively. Many devices available for consumer purchase fall short of achieving such a goal. This disclosure addresses enhancements to navigational control as affected using a navigation tool and a complimentary instruction to further provide additional navigational control within an application.

BRIEF DESCRIPTION OF THE DRAWINGS

Examplary methods and arrangements conducted and configured according to the advantageous solutions presented herein are depicted in the accompanying drawings wherein.

DETAILED DESCRIPTION

Figure 1:
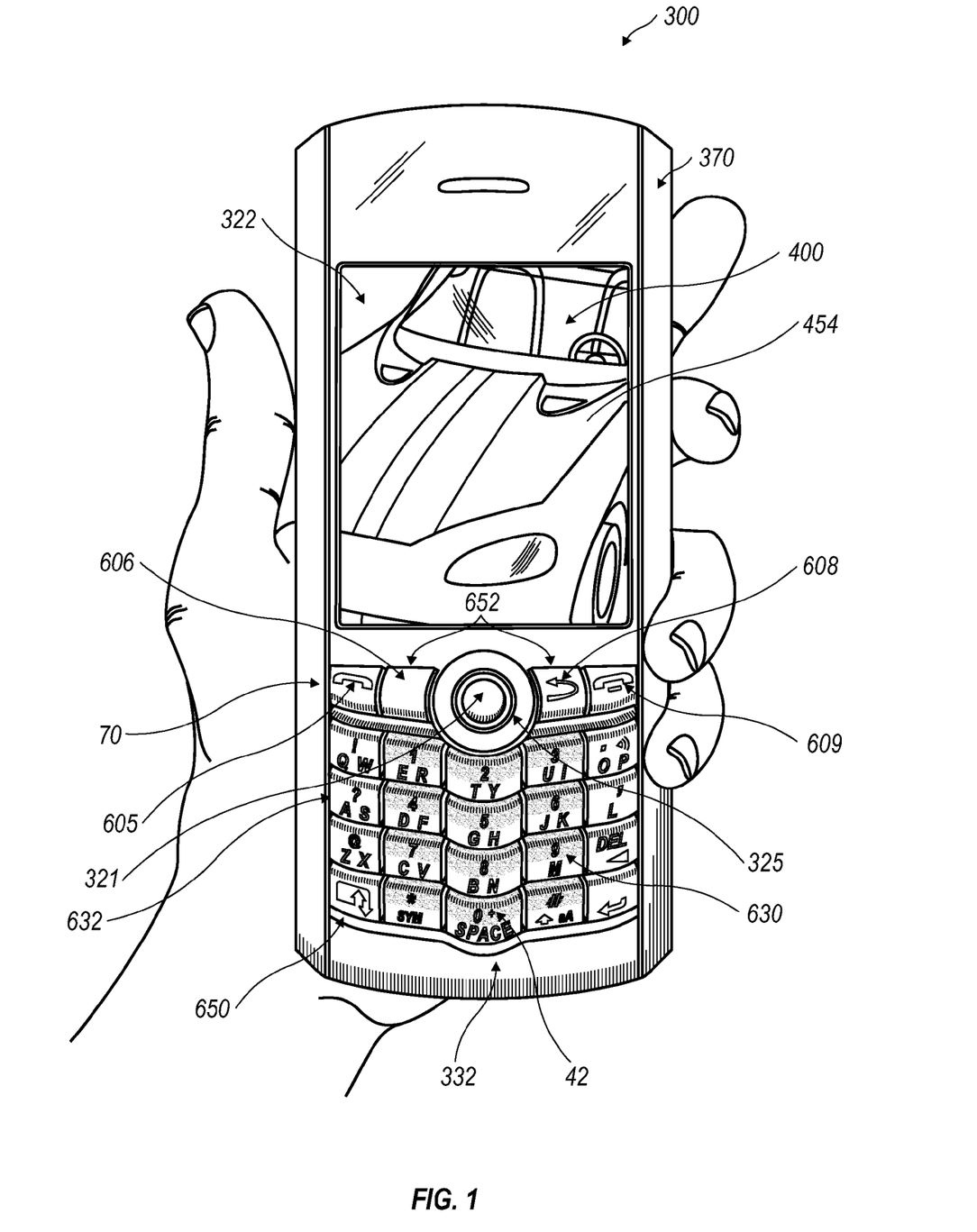
FIG. 1 illustrates a handheld wireless communication device configured according to the present teachings cradled in the palm of a user's hand.
Figure 2:
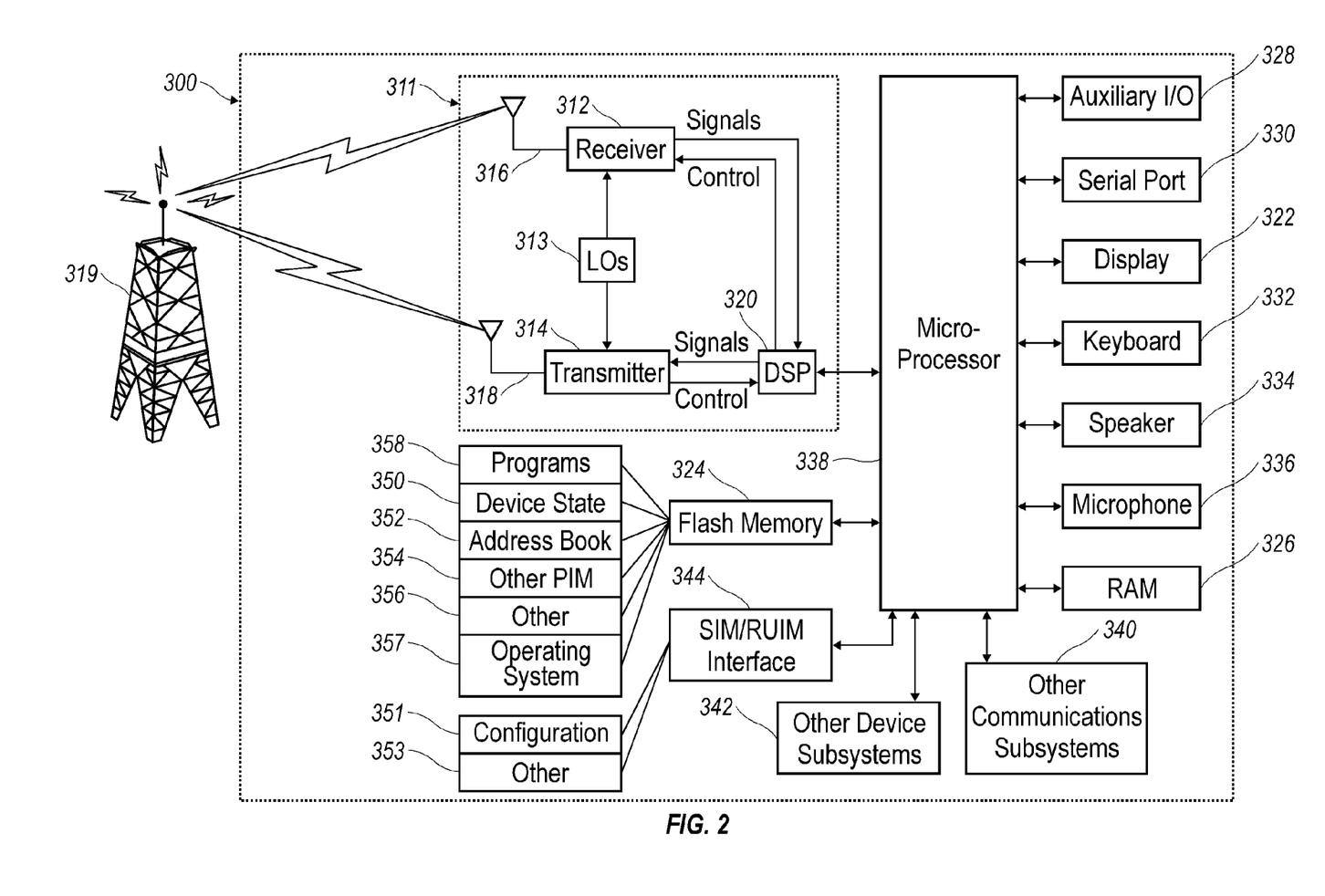
FIG. 2 is a block diagram representing a wireless handheld communication device interacting in a communication network.

An examplary handheld wireless communication device 300 is shown in FIG. 1, and the device's cooperation in a wireless network 319 is exemplified in the block diagram of FIG. 2. These figures are examplary only, and those persons skilled in the art will appreciate the additional elements and modifications necessary to make the device 300 work in particular network environments.

As shown in the block diagram of FIG. 2, the handheld device 300 includes a microprocessor 338 that controls the operation of the device 300. A communication subsystem 311 performs all communication transmission and reception with the wireless network 319. The microprocessor 338 further connects with an auxiliary input/output (I/O) subsystem 328, a serial port (preferably a Universal Serial Bus port) 330, a display 322, a keyboard 332, a speaker 334, a microphone 336, random access memory (RAM) 326, and flash memory 324. Other communication subsystems 340 and other device subsystems 342 are generally indicated as being functionally connected with the microprocessor 338 as well. An example of a communication subsystem 340 is that of a short range communication system such as BLUETOOTH® communication module or a Wi-Fi communication module (a communication module in compliance with IEEE 802.11b) and associated circuits and components. Additionally, the microprocessor 338 is able to perform operating system functions and preferably enables execution of software applications on the handheld wireless communication device 300.

The auxiliary I/O subsystem 328 can take the form of a variety of different navigation tools (multi-directional or single-directional) such as a trackball navigation tool 321 as illustrated in the examplary embodiment shown in FIG. 1, or a thumbwheel, a navigation pad, a joystick, or the like. These navigation tools are preferably located on the front surface of the handheld device 300 but may be located on any exterior surface of the handheld device 300. Other auxiliary I/O subsystems can include external display devices and externally connected keyboards (not shown). While the above examples have been provided in relation to the auxiliary I/O subsystem 328, other subsystems capable of providing input or receiving output from the handheld device 300 are considered within the scope of this disclosure. Additionally, other keys may be placed along the side of the handheld device 300 to function as escape keys, volume control keys, scrolling keys, power switches, or user programmable keys, and may likewise be programmed accordingly.

As may be appreciated from FIG. 1, the handheld wireless communication device 300 comprises a lighted display 322 located above a keyboard 332 constituting a user input and suitable for accommodating textual input to the handheld wireless communication device 300. The front face 370 of the device has a navigation row 70 and a key field 650 that includes alphanumeric keys 630, alphabetic keys 632, numeric keys 42, and other function keys as shown in FIG. 1. As shown, the handheld device 300 is of unibody construction, also known as a "candy-bar" design.

Keys, typically of a push-button or push-pad nature, perform well as data entry devices but present problems to the user when they must also be used to effect navigational control over a screen-cursor. In order to solve this problem the present handheld wireless communication device 300 preferably includes an auxiliary input 328 that acts as a cursor navigation tool and which is also exteriorly located upon the front face 370 of the device 300. Its front face location is particularly advantageous because it makes the tool easily thumb-actuable like the keys of the keyboard 332. A particularly usable embodiment provides the navigation tool in the form of a trackball 321 which is easily utilized to instruct two-dimensional screen cursor movement in substantially any direction, as well as act as an actuator when the trackball 321 is depressed like a button. The placement of the navigation tool is preferably above the keyboard 332 and below the display screen 322; here, it avoids interference during keyboarding and does not block the user's view of the display screen 322 during use. (See FIG. 1). While in other embodiments, the navigation tool can be located in a position that is convenient based on the design of the body of the handheld electronic device. For example, the navigation tool could be located on the side of the device or on the center top portion of the bottom portion of a flip phone.

Figure 6:
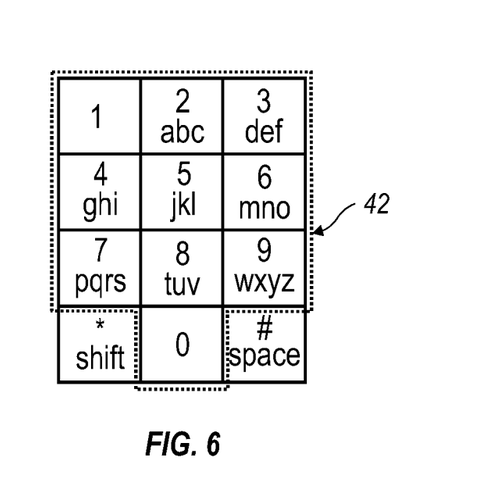
FIG. 6 illustrates a traditional or standard phone key arrangement or layout according to the ITU Standard E.161 including both numerals and letters.

As illustrated in FIG. 1, the present disclosure is directed to a handheld wireless communication device 300 configured to send and receive text messages. The handheld device 300 includes a hand cradleable body configured to be held in one hand by an operator of the device during text entry. A display 322 is included that is located on a front face 370 of the body and upon which information is displayed to the operator during text entry. A key field 650 is also located on the front face 370 of the elongate body and comprises a plurality of keys including a plurality of alphanumeric keys 630, symbol keys, and function keys. A navigation row 70 including menu keys 652 and a navigation tool is also located on the front face 370 of the body. The alphanumeric input keys 630 comprise a plurality of alphabetic and/or numeric keys (632, 42) having letters and/or numbers associated therewith. The order of the letters of the alphabetic keys 632 on the presently disclosed handheld device 300 can be described as being of a traditional, but non-ITU Standard E.161 layout. This terminology has been utilized to delineate the fact that such a telephone keypad as depicted in FIG. 6 may not allow for efficient alphabetic-text entry on the handheld device 300.

The handheld wireless communication device 300 is also configured to send and receive voice communications such as mobile telephone calls. To facilitate telephone calls, two call keys 605, 609 ("outer keys") are provided in the upper, navigation row 70 (so-called because it includes the navigation tool assembly) at the outer ends of the navigation row 70. One of the two call keys is a call-initiation key 605, and the other is a call-termination key 609. The navigation row 70 also includes another pair of keys ("flanking keys") that are located immediately adjacent to the navigation tool, with one flanking key on either side of the navigation tool. It is noted that the outer keys (605,609) are referred to as such not because they are necessarily the outermost keys in the navigation row 70—there may be additional keys located even further outwardly of the outer keys if desired—but rather because they are located outwardly with respect to the flanking keys. The flanking keys may, for instance, constitute the menu keys 652, which include a menu call-up key 606 and an escape or back key 608. The menu call-up key 606 is used to bring up a menu on the display screen 322 and the escape key 608 is used to return to the previous screen or previous menu selection. The functions of the call keys and the menu keys may, of course, be provided by buttons that are located elsewhere on the handheld device 300, with different functions assigned to the outer keys and the flanking keys.

Furthermore, the handheld device 300 is equipped with components to enable operation of various programs, as shown in FIG. 2. In an examplary embodiment, the flash memory 324 is enabled to provide a storage location for the operating system 357, device programs 358, and data. The operating system 357 is generally configured to manage other application programs 358 that are also stored in memory 324 and executable on the processor 338. The operating system 357 honors requests for services made by application programs 358 through predefined application program 358 interfaces. More specifically, the operating system 357 typically determines the order in which multiple applications 358 are executed on the processor 338 and the execution time allotted for each application 358. In addition, the operating system 357, manages the sharing of memory 324 among multiple applications 358, handles input and output to and from other device subsystems 342, and performs other similar functions. In addition, users can typically interact directly with the operating system 357 through a user interface usually including the keyboard 332 and display screen 322. While in an examplary embodiment the operating system 357 is stored in flash memory 324, the operating system 357 in other embodiments is stored in read-only memory (ROM) or similar storage element (not shown). As those skilled in the art will appreciate, the operating system 357, device application 358 or parts thereof may be loaded in RAM 326 or other volatile memory.

In one examplary embodiment, the flash memory 324 contains programs/applications 358 for execution on the handheld device 300 including an address book 352, a personal information manager (PIM) 354, and the device state 350. Furthermore, programs 358 and other information 356 including data can be segregated upon storage in the flash memory 324 of the handheld device 300.

When the handheld device 300 is enabled for two-way communication within the wireless communication network 319, it can send and receive signals from a mobile communication service. Examples of communication systems enabled for two-way communication include, but are not limited to, the General Packet Radio Service (GPRS) network, the Universal Mobile Telecommunication Service (UTMS) network, the Enhanced Data for Global Evolution (EDGE) network, and the Code Division Multiple Access (CDMA) network and those networks, generally described as packet-switched, narrowband, data-only technologies which are mainly used for short burst wireless data transfer. For the systems listed above, the handheld wireless communication device 300 must be properly enabled to transmit and receive signals from the communication network 319. Other systems may not require such identifying information. GPRS, UMTS, and EDGE require the use of a Subscriber Identity Module (SIM) in order to allow communication with the communication network 319. Likewise, most CDMA systems require the use of a Removable Identity Module (RUIM) in order to communicate with the CDMA network. The RUIM and SIM card can be used in multiple different communication devices 300. The handheld communication device 300 may be able to operate some features without a SIM/RUIM card, but it will not be able to communicate with the network 319. A SIM/RUIM interface 344 located within the device 300 allows for removal or insertion of a SIM/RUIM card (not shown). The SIM/RUIM card features memory and holds key configurations 351, and other information 353 such as identification and subscriber related information. With a properly enabled communication device 300, two-way communication between the handheld wireless communication device 300 and communication network 319 is possible.

If the handheld wireless communication device 300 is enabled as described above or the communication network 319 does not require such enablement, the two-way communication enabled handheld device 300 is able to both transmit and receive information from the communication network 319. The transfer of communication can be from the handheld device 300 or to the device 300. In order to communicate with the communication network 319, the handheld device 300 in the presently described examplary embodiment is equipped with an integral or internal antenna 318 for transmitting signals to the communication network 319. Likewise the handheld wireless communication device 300 in the presently described examplary embodiment is equipped with another antenna 316 for receiving communication from the communication network 319. These antennae (316, 318) in another examplary embodiment are combined into a single antenna (not shown). As one skilled in the art would appreciate, the antenna or antennae (316, 318) in another embodiment are externally mounted on the handheld device 300.

When equipped for two-way communication, the handheld wireless communication device 300 features a communication subsystem 311. As is well known in the art, this communication subsystem 311 is modified so that it can support the operational needs of the handheld device 300. The subsystem 311 includes a transmitter 314 and receiver 312 including the associated antenna or antennae (316, 318) as described above, local oscillators (LOs) 313, and a processing module 320 which in the presently described examplary embodiment is a digital signal processor (DSP) 320.

It is contemplated that communication by the handheld device 300 with the wireless network 319 can be any type of communication that both the wireless network 319 and handheld device 300 are enabled to transmit, receive and process. In general, these can be classified as voice and data. Voice communication is communication in which signals for audible sounds are transmitted by the handheld device 300 through the communication network 319. Data is all other types of communication that the handheld device 300 is capable of performing within the constraints of the wireless network 319.

Example device applications that can depend on such data include email, contacts and calendars. For each such application, synchronization with home-based versions on the applications can be critical for either or both of their long term and short term utility. As an example, emails are often time sensitive, so substantially real time synchronization is highly desirable. Contacts, on the other hand, can be usually updated less frequently without inconvenience. Therefore, the utility of the handheld device 300 is significantly enhanced (if not enabled) when connectable within a communication system, and particularly when connectable on a wireless basis in a network 319 in which voice, text messaging, and other data transfer are accommodated.

As intimated hereinabove, one of the more important aspects of the handheld wireless communication device 300 to which this disclosure is directed is its size. While some users will grasp the handheld device 300 in both hands, it is intended that a predominance of users will cradle the handheld device 300 in one hand in such a manner that input and control over the handheld device 300 can be effected using the thumb of the same hand in which the handheld device 300 is held. However, it is appreciated that additional control can be effected by using both hands. As a handheld device 300 that is easy to grasp and desirably pocketable, the size of the handheld device 300 must be kept commensurately small. Of the device's dimensions, limiting its width is important for the purpose of assuring cradleability in a user's hand. Moreover, it is preferred that the width of the handheld device 300 be maintained at less than eight centimeters (approximately three inches). Keeping the handheld device 300 within these dimensional limits provides a hand cradleable unit that users prefer for its usability and portability. Limitations with respect to the height (length) of the handheld device 300 are less stringent when considering hand-cradleability. Therefore, in order to gain greater size, the handheld device 300 can be advantageously elongated so that its height is greater than its width, but still remains easily supported and operated in one hand.

A potential drawback is presented by the small size of the handheld device 300 in that there is limited exterior surface area for the inclusion of user input and device output features. This is especially true for the "prime real estate" on the front face 370 of the handheld device 300, where it is most advantageous to include a display screen 322 that outputs information to the user. The display screen 322 is preferably located above a keyboard 332 that is utilized for data entry into the handheld device 300 by the user. If the screen 322 is provided below the keyboard 332, a problem occurs in that viewing the screen 322 is inhibited when the user is inputting data using the keyboard 332. Therefore it is preferred that the display screen 322 be above the input area, thereby solving the problem by assuring that the hands and fingers do not block the view of the screen 322 during data entry periods.

To facilitate textual data entry into the handheld device 300, an alphabetic keyboard 332 is provided. In the examplary illustrated embodiment, a full alphabetic keyboard 332 is utilized in which there is one key per letter (with some of the letter keys also having numbers, symbols, or functions associated with them). In this regard, the associated letters can be advantageously organized in QWERTY, QWERTZ, AZERTY, or Dvorak layouts, among others, thereby capitalizing on certain users' familiarity with these various letter orders. In order to stay within the bounds of the limited front surface area, however, each of the keys must be commensurately small when, for example, twenty-six keys must be provided in the instance of the English language.

As shown in FIG. 1, the handheld wireless communication device 300 is cradleable in the palm of a user's hand. The handheld device 300 is provided with a keyboard 332 to enter text data and place telephone calls and a display screen 322 for communicating information to the user. A connect/send key 605 is preferably provided to aid in the placement of a phone call. Additionally, a disconnect/end key 609 is provided. The send key 605 and end key 609 preferably are arranged in the navigation row 70 including the navigation tool. Additionally, the navigation row 70 preferably has a menu call-up key 606 and a back key or escape key 608.

The keyboard 332 includes a plurality of keys that can be of a physical nature such as actuable buttons, or they can be of a software nature, typically constituted by virtual representations of physical keys on a display screen 322 (referred to herein as "virtual keys"). It is also contemplated that the user input can be provided as a combination of the two types of keys. Each key of the plurality of keys has at least one actuable action which can be the input of a character, a command or a function. In this context, "characters" are contemplated to exemplarily include alphabetic letters, language symbols, numbers, punctuation, insignias, icons, pictures, and even a blank space. Input commands and functions can include such things as delete, backspace, moving a cursor up, down, left or right, initiating an arithmetic function or command, initiating a command or function specific to an application program or feature in use, initiating a command or function programmed by the user and other such commands and functions that are well known to those persons skilled in the art. Specific keys or other types of input devices can be used to navigate through the various applications and features thereof. Further, depending on the application 358 or feature in use, specific keys can be enabled or disabled.

In the case of physical keys, all or a portion of the plurality of keys have one or more indicia representing character(s), command(s), and/or functions(s) displayed at their top surface and/or on the surface of the area adjacent the respective key. In the instance where the indicia of a key's function is provided adjacent the key, the indicia can be printed on the device cover beside the key, or in the instance of keys located adjacent the display screen 322. Additionally, current indicia for the key may be temporarily shown nearby the key on the screen 322.

In the case of virtual keys, the indicia for the respective keys are shown on the display screen 322, which in one embodiment is enabled by touching the display screen 322, for example, with a stylus to generate the character or activate the indicated command or function. Some examples of display screens 322 capable of detecting a touch include resistive, capacitive, projected capacitive, infrared and surface acoustic wave (SAW) touchscreens.

Physical and virtual keys can be combined in many different ways as appreciated by those skilled in the art. In one embodiment, physical and virtual keys are combined such that the plurality of enabled keys for a particular application or feature of the handheld wireless communication device 300 is shown on the display screen 322 in the same configuration as the physical keys. Using this configuration, the user can select the appropriate physical key corresponding to what is shown on the display screen 322. Thus, the desired character, command or function is obtained by depressing the physical key corresponding to the character, command or function displayed at a corresponding position on the display screen 322, rather than touching the display screen 322.

Figure 3A:
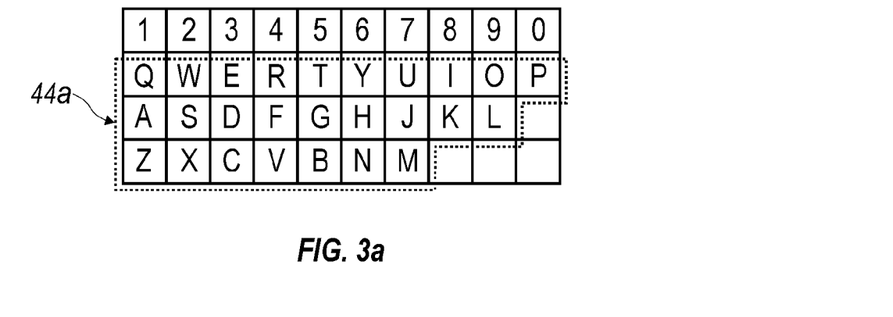
FIG. 3a illustrates an examplary QWERTY keyboard layout.
Figure 3B:
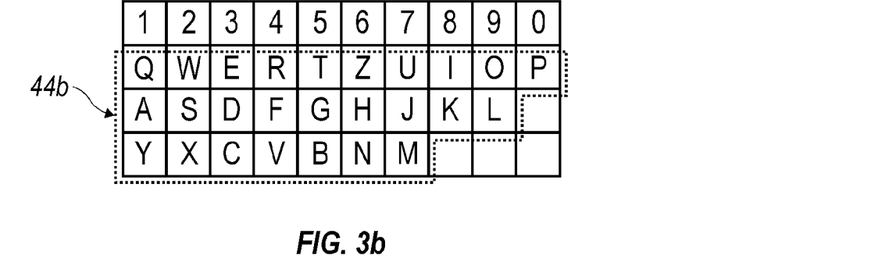
FIG. 3b illustrates an examplary QWERTZ keyboard layout.
Figure 3C:
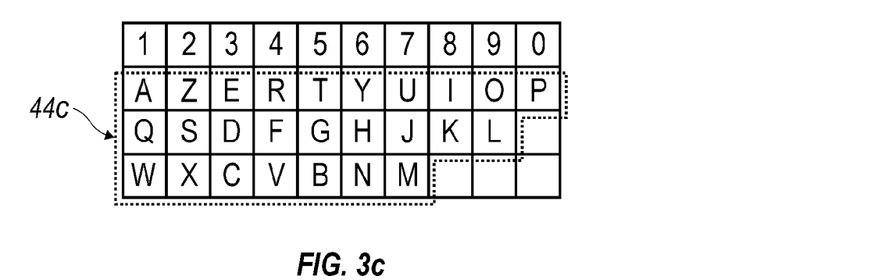
FIG. 3c illustrates an examplary AZERTY keyboard layout.
Figure 3D:
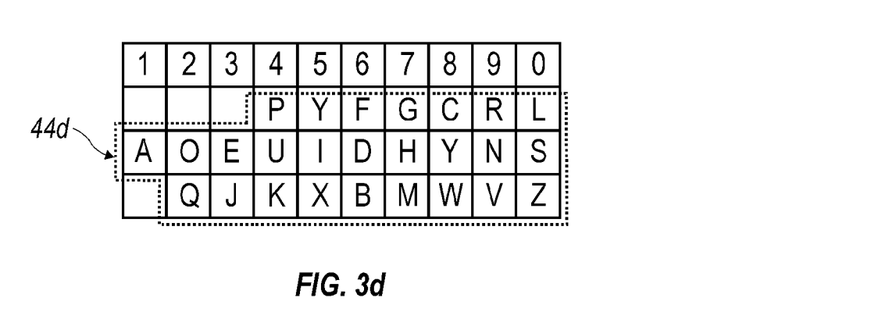
FIG. 3d illustrates an examplary Dvorak keyboard layout.

The various characters, commands, and functions associated with keyboard typing in general are traditionally arranged using various conventions. The most common of these in the United States, for instance, is the QWERTY keyboard layout. Others include the QWERTZ, AZERTY, and Dvorak keyboard configurations. The QWERTY keyboard layout is the standard English-language alphabetic key arrangement 44a shown in FIG. 3a. The QWERTZ keyboard layout is normally used in German-speaking regions; this alphabetic key arrangement 44b is shown in FIG. 3b. The AZERTY keyboard layout 44c is normally used in French-speaking regions and is shown in FIG. 3c. The Dvorak keyboard layout was designed to allow typists to type faster; this alphabetic key arrangement 44d is shown in FIG. 3d. In other examplary embodiments, keyboards having multi-language key arrangements can be implemented.

Figure 4:
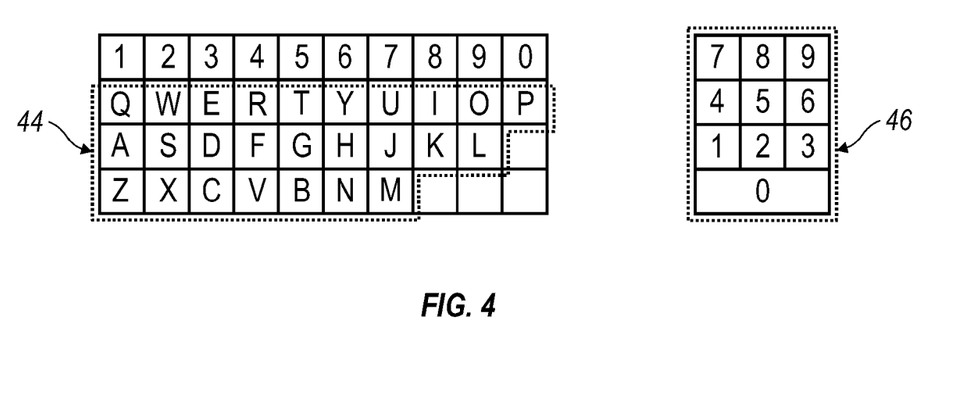
FIG. 4 illustrates a QWERTY keyboard layout paired with a traditional ten-key keyboard.
Figure 5:
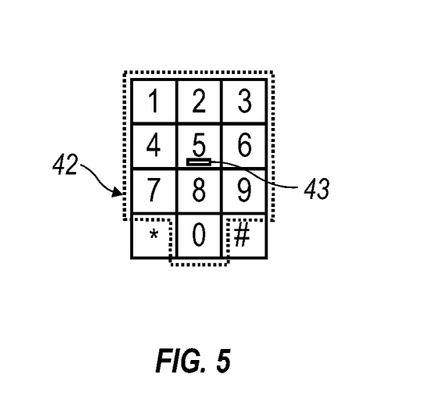
FIG. 5 illustrates ten digits comprising the numerals 0-9 arranged in a traditional, ITU Standard E.161 numeric telephone keypad layout, including the * and # keys flanking the 0 key.

Alphabetic key arrangements are often presented along with numeric key arrangements. Typically, the numbers 1-9 and 0 are positioned in the row above the alphabetic keys 44a-d, as shown in FIG. 3a-d. Alternatively, the numbers share keys with the alphabetic characters, such as the top row of the QWERTY keyboard. Yet another examplary numeric key arrangement is shown in FIG. 4, where a "ten-key" style numeric keypad 46 is provided on a separate set of keys that is spaced from the alphabetic/numeric key arrangement 44. Still further, ten-key numeric arrangements may be common with or shared with a subset of the alphabetic keys, as best shown in FIGS. 5 and 6. The ten-key styled numeric keypad 46 includes the numbers "7", "8", "9" arranged in a top row, "4", "5", "6" arranged in a second row, "1", "2", "3" arranged in a third row, and "0" in a bottom row. Further, a numeric phone key arrangement 42 is exemplarily illustrated in FIG. 5.

As shown in FIG. 5, the numeric phone key arrangement 42 may also utilize a surface treatment on the surface of the center "5" key. This surface treatment is configured such that the top surface of the key is distinctive from the surface of other keys. Preferably the surface treatment is in the form of a raised bump or recessed dimple 43. Alternatively, raised bumps may be positioned on the housing around the "5" key and do not necessarily have to be positioned directly on the key.

It is desirable for handheld devices 300 to include a combined text-entry keyboard and a telephony keyboard. Examples of such handheld devices 300 include mobile stations, cellular telephones, wireless personal digital assistants (PDAs), two-way paging devices, and others. Various keyboards are used with such devices and can be termed a full keyboard, a reduced-format keyboard, or phone key pad. In embodiments of a handheld device 300 having a full keyboard, the alphabetic characters are singly associated with the plurality of physical keys. Thus, in an English-language keyboard of this configuration, there are at least 26 keys in the plurality, with one letter per alphabetic key.

FIGS. 5 and 6 both feature numeric keys arranged according to the ITU Standard E.161 form. In addition, FIG. 6 also incorporates alphabetic characters according to the ITU Standard E.161 layout as well.

Figure 7:
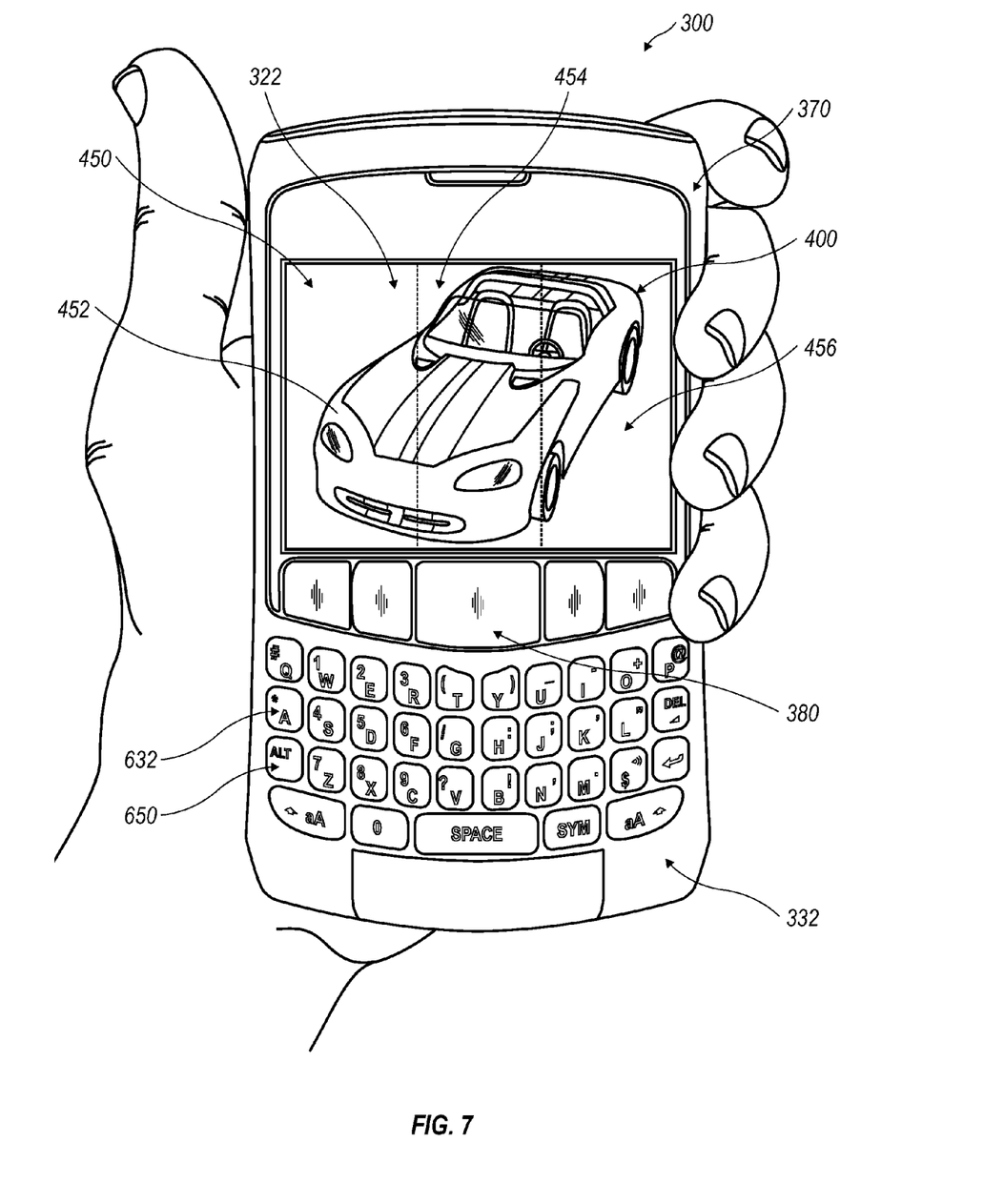
FIG. 7 illustrates a full keyboard handheld electronic device according to the present disclosure.

Reference is now made to FIG. 7, which discloses an examplary embodiment having a full alphabetic keyboard arrangement. In particular, as shown in FIG. 7, only one letter of the alphabet is associated with any given alphabetic key 632 within the keys of the keyfield 650. This is in contrast to reduced-format arrangements, in which multiple letters of the alphabet may be associated with at least some of the alphabetic keys 632 of a keyboard 332. Additionally, as alluded to above and shown in the referenced figures, some of the alphabetic keys 632 also have numbers, symbols, or functions associated with them. In the specifically illustrated embodiment, the alphabetic keys (including those also having numbers, symbols, or functions associated with them) are arranged in a QWERTY arrangement, although any of the other full-keyboard arrangements (QWERTZ, AZERTY, or Dvorak) may also be implemented within the scope of this disclosure. Furthermore, the handheld device 300 shown in FIG. 7 has a touch pad 380 for the navigation tool instead of the trackball 321 as shown in other figures.

As described above, the International Telecommunications Union ("ITU") has established phone standards for the arrangement of alphanumeric keys. The standard phone numeric key arrangement shown in FIGS. 5 (no alphabetic letters) and 6 (with alphabetic letters) corresponds to ITU Standard E.161, entitled "Arrangement of Digits, Letters, and Symbols on Telephones and Other Devices That Can Be Used for Gaining Access to a Telephone Network." This standard is also known as ANSI TI.703-1995/1999 and ISO/IEC 9995-8:1994. As shown in FIG. 1, the numeric key arrangement can be overlaid on a QWERTY arrangement. The numeric arrangement as shown can be aptly described as a top-to-bottom ascending order three-by-three-over-zero pattern.

While several keyboard layouts have been described above, the layouts can be described as having keys disposed on the keyboard in a QWERTY, reduced QWERTY, QWERTZ, Dvorak, or AZERTY key layout. These familiar keyboard layouts allow users to type more intuitively and quickly than, for example, on the standard alphabetic layout on a telephone pad. As mentioned above, the key arrangements can be reduced compared to a standard layout through the use of more than one letter or character per key. By utilizing fewer keys, the keys can be made larger and therefore more convenient to the user.

In at least one embodiment, a handheld wireless communication device 300 that is configured to send and receive email text messages comprises a hand cradleable body configured to be held in a text entry orientation by an operator or user. (For example see FIGS. 1 and 7). The body of the handheld wireless communication device 300 has a front face 370 at which a display screen 322 is located and upon which information is displayed to the operator of the handheld device 300 in the text entry orientation. The handheld device 300 further comprises a microprocessor 338 configured to run software programs on the handheld device 300 and to receive operator commands from user inputs, such as a keyboard 332 and trackball navigation tool 321, located on the handheld device 300.

In order to navigate within an application page, a navigation tool is provided on the handheld electronic device 300. Some examples of navigation tools include the trackball 321 (shown in at least FIG. 1), touch pad 380 (shown in FIG. 7), 4-way navigation pad, trackwheel, roller-barrel, joystick, and the like. These devices enable the operator of the handheld device 300 to control movement of a cursor on the display screen 322 of the handheld device 300. Furthermore, when an application displays a portion of an application page 400, such as a portion of a website, the navigation tool allows the operator to scroll through the displayed page. When the operator scrolls through the application page 400 it may require the user to repeatedly depress or otherwise actuate the navigation tool to reach the bottom of the page, for instance. Likewise, the operator may need to scroll to the top, right, or left of a displayed application page 400. Furthermore, when an application such as an email application lists a plurality of email messages 410, it may take a substantial amount of time to scroll through the listing.

Figure 8:
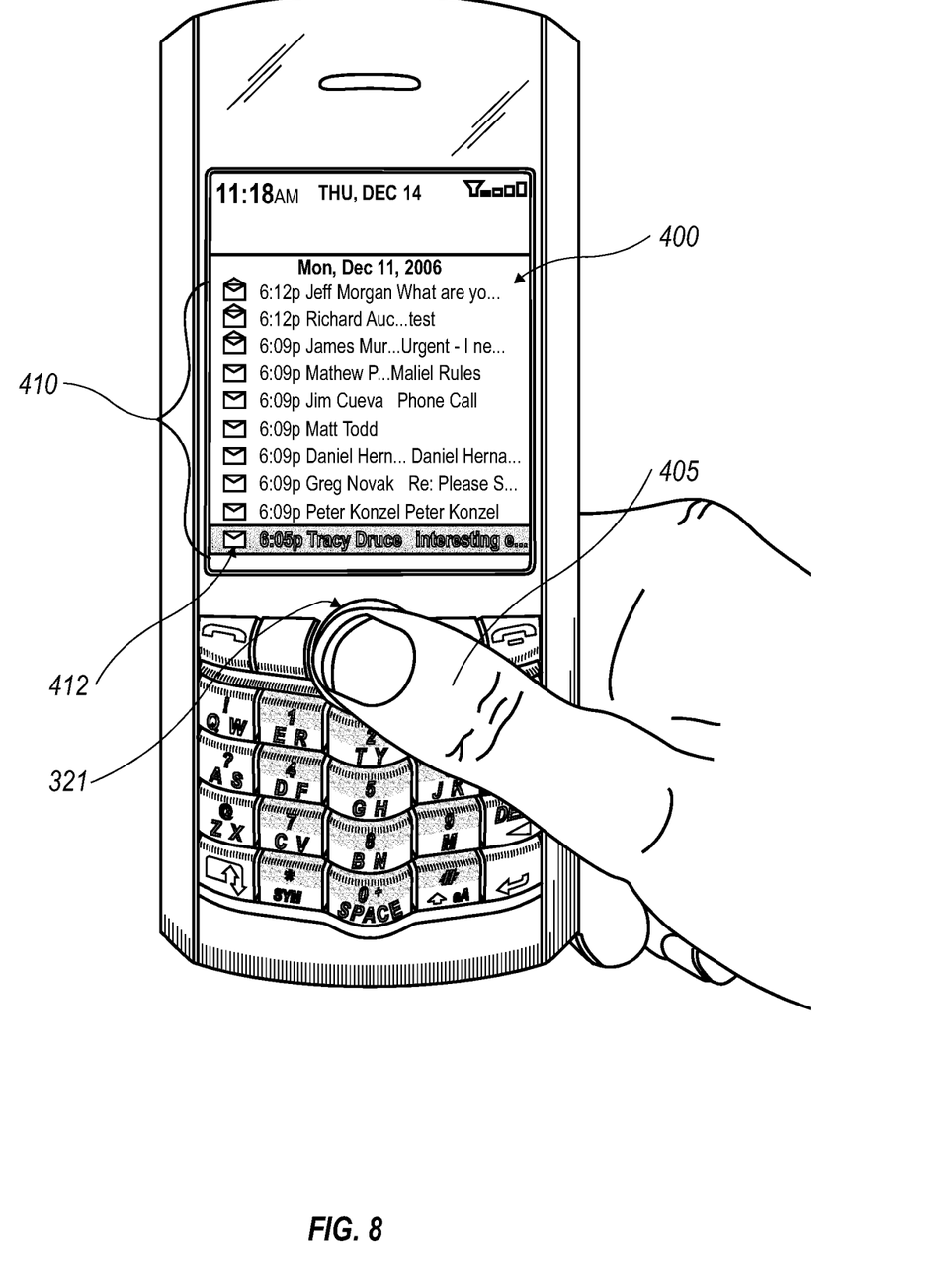
FIG. 8 illustrates an application page including an email listing on a display screen of a handheld electronic device according to the present disclosure.

In order to obviate the need for these lengthy actuations of the navigation tool, shortcuts have typically been provided. For example, when scrolling through a listing of emails 410 some applications implement a special key sequence or key to scroll to the top or bottom of the email listing 410. For example, while an email listing 410 is shown the following keys can be implemented instead of using the navigation tool. In order to select the top item or bottom item shown on the displayed page, the operator can select the "UI" or "M" key respectively. Alternatively, the operator may desire to jump to the bottom or top of the listing, which can be accomplished by the operator selecting the "CV" or "ER" keys respectively. These short cut keys enable the operator to effectively navigate through multiple displayed pages with easy. While the above has been described in relation to a listing of email messages 410 similar short cuts can be applied to navigation on webpages or other application pages that do not fit on the display screen. An example of a navigable page is shown in FIG. 7 and an example of an email listing 410 is shown in FIG. 8.

In at least one embodiment, a handheld electronic device 300 has a microprocessor-run software application program that requires operator instructed navigation. The application program receives navigation instruction from the operator through one of the above described navigation tools. The operator is able to indicate a direction and degree of navigation within the application program using the navigation tool which then provides instructions to the application program. The direction of navigation indicated by the navigation tool controls the direction the cursor or other on screen navigation indicator travels on the application page 400. This direction of navigation can be directed at the displayed data such as a webpage or image where no cursor or other indicator is displayed and instead navigation affects what portion of the image is presented on the display screen 322. Furthermore, the application program receives a complimentary instruction from the operator that adapts the instructed degree of navigation to be affected in the application program.

When the application program receives the complimentary instruction navigation control can be enhanced by allowing the operator the ability to change the degree of navigation. For instance when scrolling through email listings 410 or a website, the operator can use this complimentary instruction to jump through one displayed page at the time or jump to the bottom of the application page 400. Thus, the operator can achieve greater control and navigate within an application page 400 at enhanced speed.

The complimentary instruction can be input through a variety of different ways, a few of which are described below. In one embodiment, the directional navigation instruction and complimentary instruction are each input to the handheld device 300 through the navigation tool. In another embodiment, the complimentary instruction is input to the handheld device 300 using a secondary user input which is different from the navigation tool. For instance, the secondary user input could be a keyboard 332, a touch sensitive device, a capacitive sensitive device, a contact sensitive device, or an accelerometer, among others. In the case of a keyboard 332, a key can be depressed in short proximity to the actuation of the navigation tool. When the additional input from one of these secondary inputs is provided to the application program, further adaptation to the instructed degree of navigation is performed.

In one example, the complimentary instruction amplifies the instructed degree of navigation. For example, when the user actuates the navigation tool to instruct a downward direction, the complimentary instruction causes the navigation on the display screen 322 to occur at a higher rate in the instructed downward direction. The rate can be an incremental increase depending upon the length of activation of the secondary input, such that the longer the secondary user input device is activated, likewise, the rate at which the on screen navigation occurs is increased in a proportional fashion.

Figure 9:
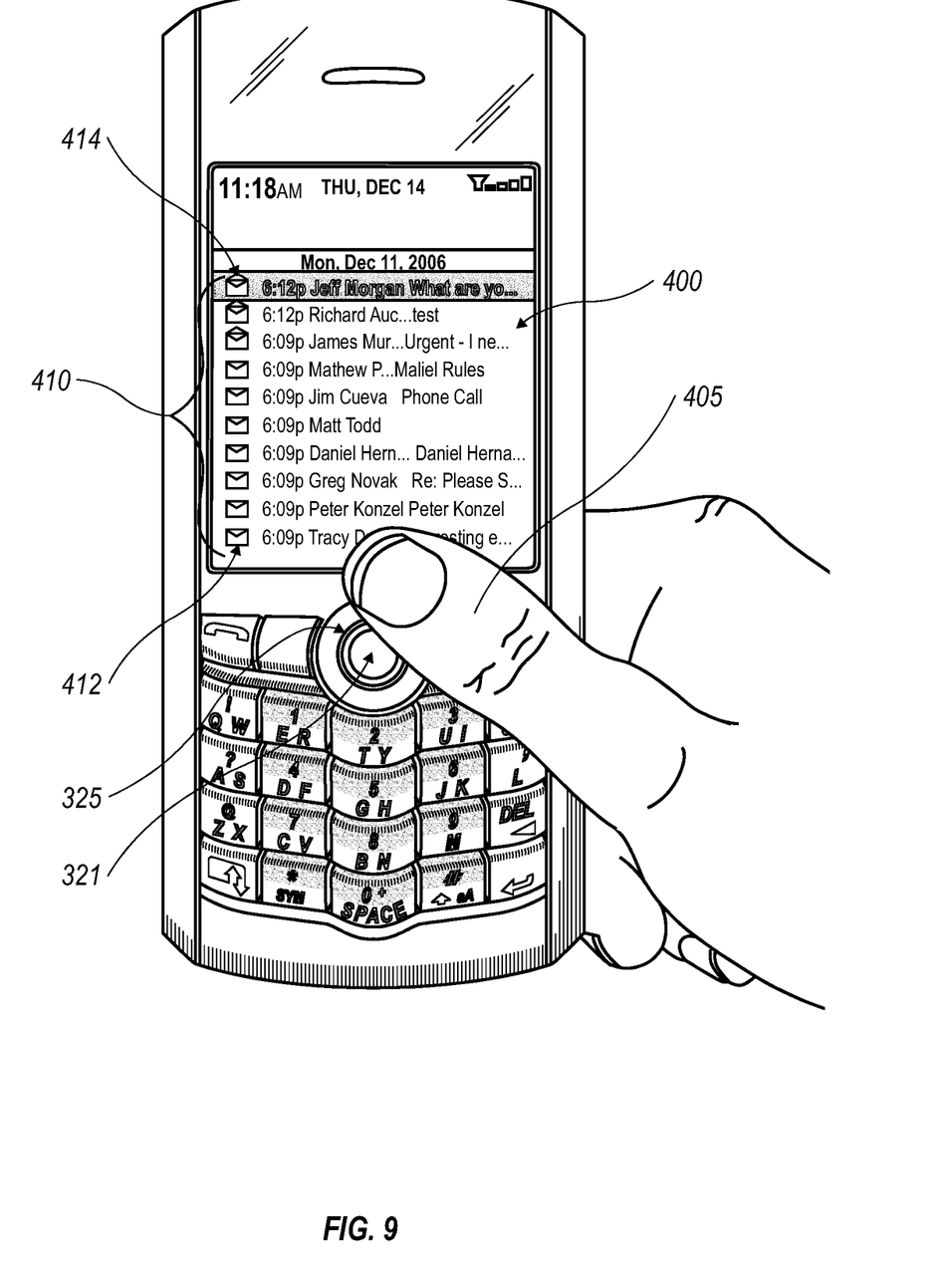
FIG. 9 illustrates a page-up instruction in a program application on a handheld device according to the present disclosure.

Further examples of possible motion of the displayed application page are presented below in relation to FIGS. 1, 7-12. When an email listing 410 is presented by an application program such as an email or text message management program, the operator may wish to navigate up and down the list. If the highlighting cursor, as shown in FIG. 8, is located at an email 412 at the bottom of the list and the operator desires to navigate to the top of the list 410, the operator can move the cursor through the list 410 by rotating the trackball 321. When the operator rotates the trackball 321, the cursor passes over each displayed email. However, if the operator wishes to move more quickly to the top of the email listing 410, the operator rotates the trackball 321 and receives the complementary instruction from the operator to adapt the degree of navigation. The complementary instruction can include those as described above. As shown in FIG. 9, when the operator rotates the trackball 321 with the operator's thumb 405, once finished actuating the trackball 321, the thumb 405 can contact the surface located above the trackball 321. If the surface is configured to detect touch or contact, this contact with the secondary user input device provides the complimentary instruction to be input to the application program. In this scenario, the secondary user input device is positioned relative to the trackball 321. Furthermore, the direction indicated on the secondary user input device is in a direction that is essentially the same as the direction of the received directional navigation instruction.

Additionally, this disclosure contemplates the use of additional inputs from the operator of the device to enable the application program to perform more advanced functionality. For instance, the operator can rotate the trackball 321 in a given direction and cause contact with the surface multiple times causing the application to scroll through sequential pages of the application program. Furthermore, an end of list or end of page function can be enabled through a sequence of rolling the trackball 321 in a given direction and contacting the surface in the same direction and continuing to contact the surface after the first contact takes place. Likewise, this end of list or end of page function can be performed when the operator rotates the trackball 321 in a given direction and contacts the surface a first time and then subsequently causes additional prolonged contact with the surface. Additionally, the end of page could be implemented by rolling the trackball 321 downward and subsequently double-tapping the surface below the trackball 321. In order to enable the device to detect when the scrolling capability is no longer desired a timing feature can be implemented such that if the device does not detect the additional navigation input within a predetermined period of time after actuation of the trackball 321, the scrolling capability is disabled and normal navigation mode applies. While further examples are given below in relation to up, down, left, and right directional navigation of pages or lists, the navigation of these pages or lists may also be enabled using the sequences of the contacts as described above in the appropriate corresponding direction to the navigation of the trackball 321.

While the remaining examples provided herein focus on a touch sensitive surface located on the front surface of the device 300, similar actuation of other secondary input devices can be understood as well. For instance, if the operator rotates the trackball 321 in an upward fashion, actuation of a key could provide the secondary input. The key could be associated with a keyboard 332 where the keys are traditionally arranged such that depression of the key is required. Alternatively, the key could be a part of a touch or contact sensitive surface which is capable of discriminating which area has been actuated. Furthermore, the key could be part of touch or contact sensitive display that is capable of adaptation of the displayed keys and the like. Additionally, the ring 325 (shown in at least FIG. 1) around the trackball 321 could be configured to accept input from the operator such that when the operator caused contact with the ring 325, a secondary input could be provided that produces the complimentary instruction. In at least one embodiment, the actuation of the secondary user input device can be subsequent to the actuation of the navigation tool. While in other embodiments, the actuation of the secondary user input device is simultaneous with the actuation of the navigation tool.

The degree of navigation can be changed according to a variety of different levels as desired by the device manufacturer, operator, or other person's capable of controlling the device, such as administrators. In one example, when the navigation tool has indicated an upward direction followed by the activation of the secondary user input in the same upward direction, the application program initiates a page-up instruction. This can be further understood in relation the figures herein. In FIG. 8, an email listing 410 is shown where the bottom email 412 on the page is selected. The operator rotates the trackball 321 in an upward direction and subsequently causes contact with the secondary user input, which in this example is a contact sensitive surface surrounding the trackball 321. Once the application program receives this instruction, a page-up instruction is performed. Thus, the navigation cursor is moved to indicate that the top email 414 is selected (as illustrated in FIG. 9). Additionally, a multiple page up function can be enabled within the application program through multiple contacts with the contact sensitive surface above the trackball 321. In one example, the number of pages that are scrolled up correspond to the number of contacts with the contact sensitive surface. Furthermore, a beginning of page or beginning of list function can be enabled when the trackball 321 has been rotated in an upward direction and a contact above the trackball 321 is made followed by a second contact which is continued for a predetermined amount of time such as two to five seconds. While the description herein for the page-up instruction has been described in relation to an email application program, other programs as previously mentioned are also capable of performing a page-up instruction.

Figure 10:
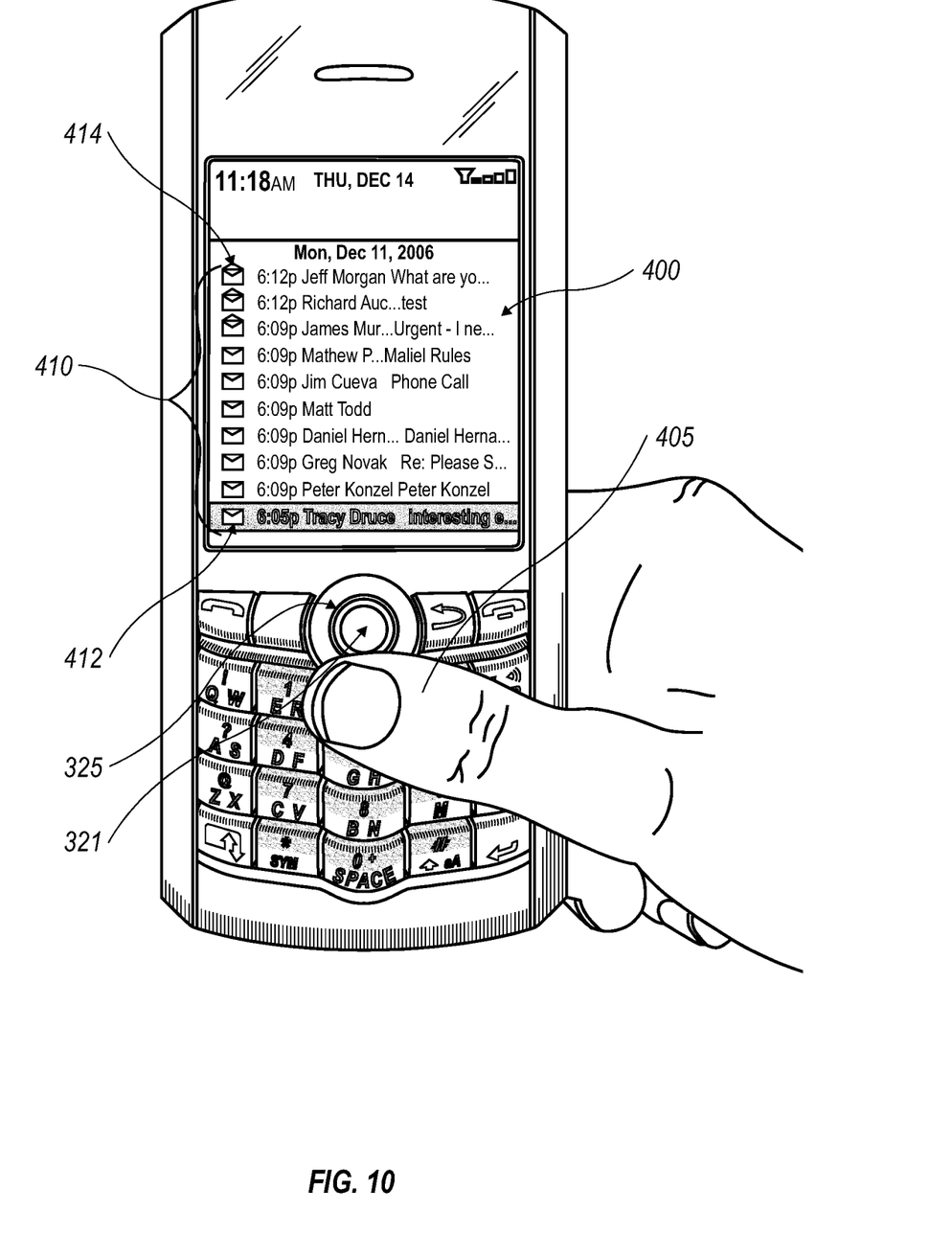
FIG. 10 illustrates a page-down instruction in a program application on a handheld device according to the present disclosure.

Other navigation functions can similarly be implemented, such as a page-down instruction. For example, when the cursor is positioned at the top email 414 as shown in FIG. 9, it is possible for the operator to perform a page-down instruction, as illustrated in FIG. 10, by rotating the ball 321 downward with the thumb 405 and subsequently contacting the secondary input device positioned below the trackball 321. Additionally, a multiple page down function can be enabled within the application program through multiple contacts with the contact sensitive surface beneath the trackball 321 after the trackball 321 has been rotated in a downward direction. In one example, the number of pages that are scrolled down correspond to the number of contacts with the contact sensitive surface. Furthermore, an end of page or end of list function can be enabled when the trackball 321 has been rotated in a downward direction and a contact below the trackball 321 is made followed by a second contact which is continued for a predetermined amount of time such as two to five seconds.

Figure 11:
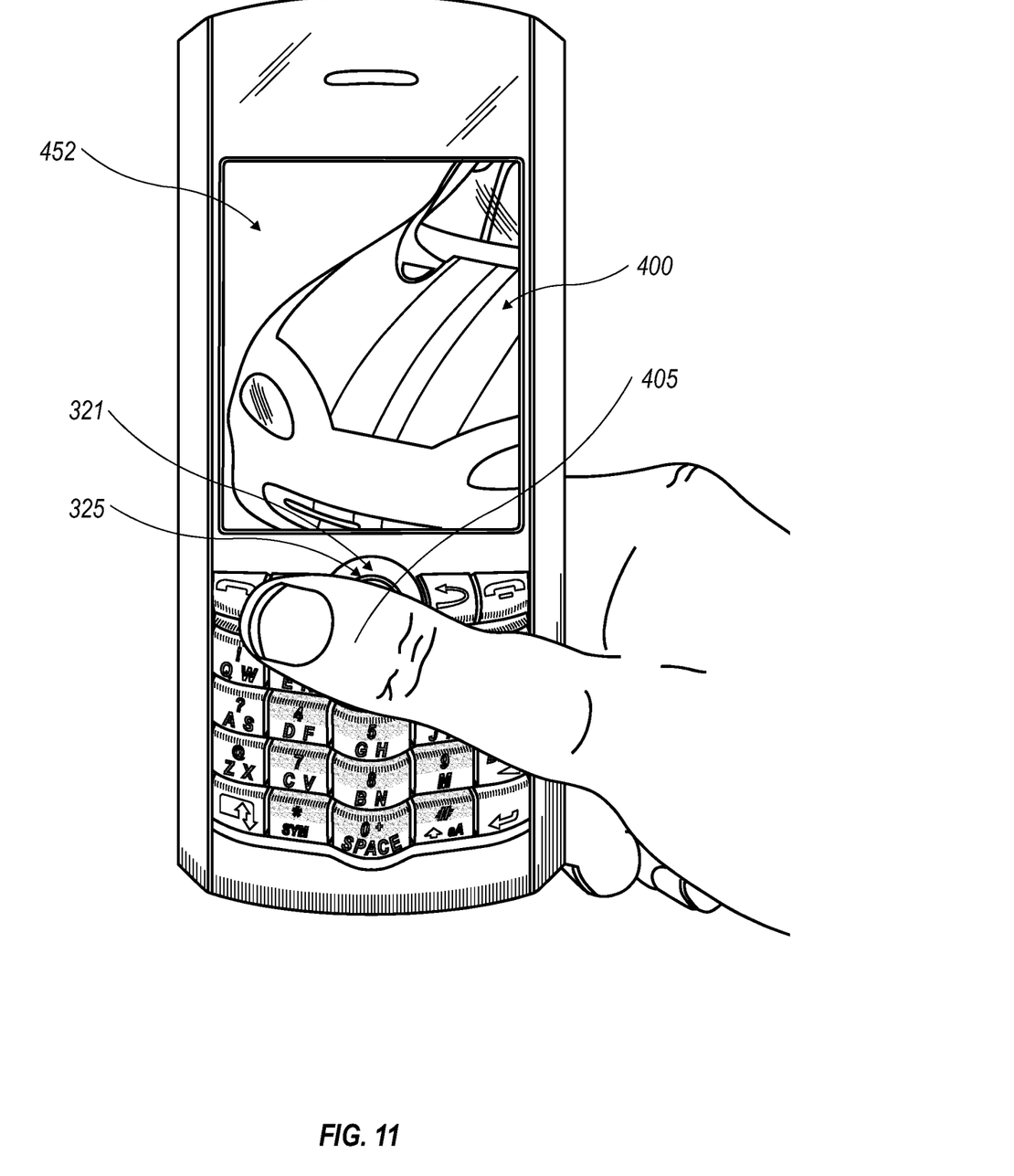
FIG. 11 illustrates a page-left instruction in a program application on a handheld device according to the present disclosure.

In order to illustrate the page-left and page-right functions, an image is used. The image could be an application page from a web browser program, a camera application, a photo viewer application, or other graphical display program. For example, consider the image 450 shown on the display screen 322 of the handheld electronic device 300 of FIG. 7. The image of FIG. 7 has left, center, and right portions (452, 454, 456). When the image is enlarged, a center portion 454 of the image 450 is shown as indicated in FIG. 1. If the operator wishes to view either the left or right portion (452, 456), the operator could use the navigation tool to scroll to the left or right. When the center portion 454 as illustrated in FIG. 1, is presented on the display screen 322, the operator may wish to display a left portion 452 of the image 450. The operator contacts the secondary user input positioned to the left of the trackball 321, when the trackball 321 is rotated to the left. This subsequent actuation of the secondary user input device initiates a page-left instruction in the program actuation. Additionally, a multiple page left function can be enabled within the application program through multiple contacts with the contact sensitive surface to the left of the trackball 321 after the trackball 321 has been rotated in a leftward direction. In one example, the number of pages that are navigated correspond to the number of contacts with the contact sensitive surface. Furthermore, a left of page function can be enabled when the trackball 321 has been rotated in a leftward direction and a contact to the left of the trackball 321 is made followed by a second contact which is continued for a predetermined amount of time such as two to five seconds.

Figure 12:
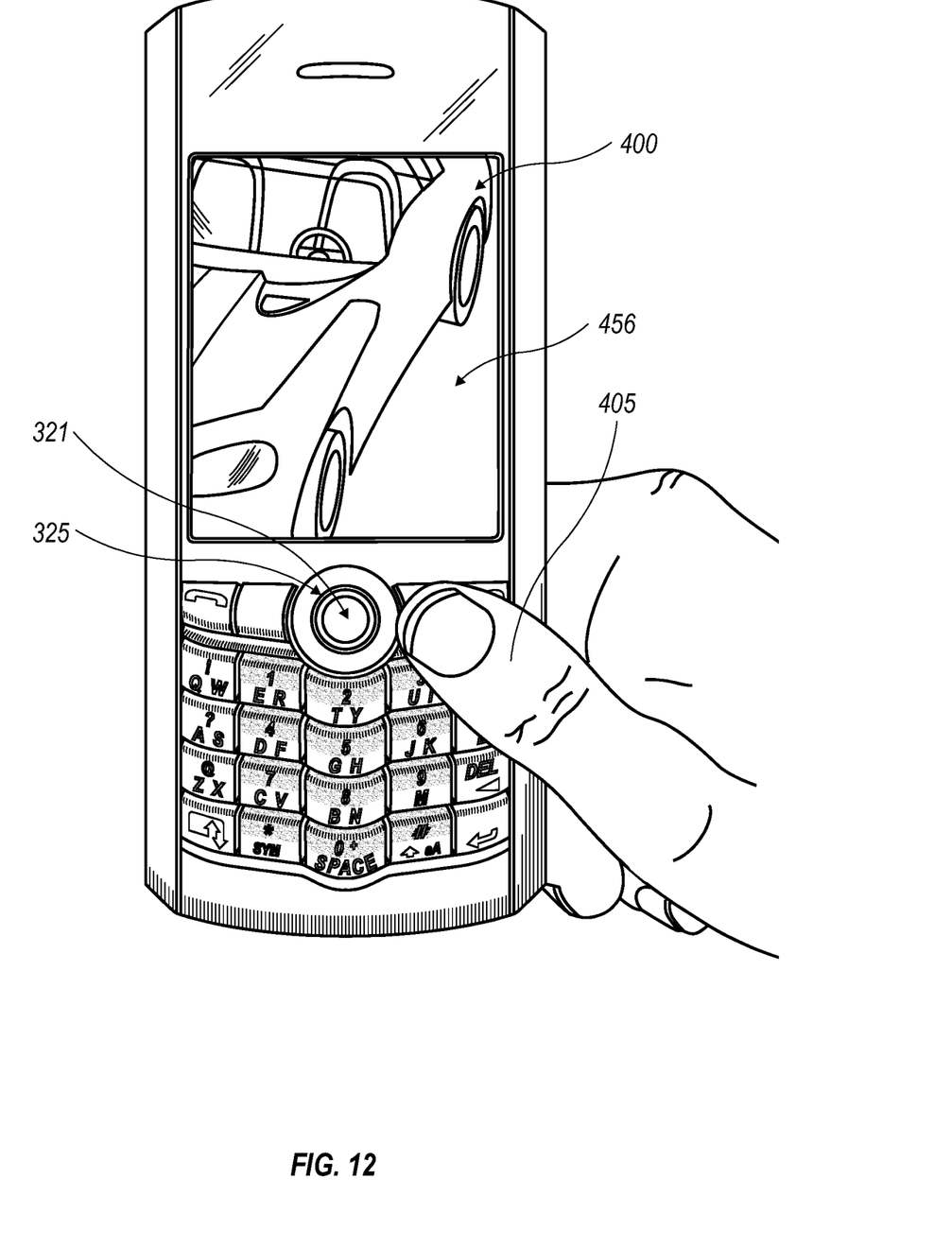
FIG. 12 illustrates a page-right instruction in a program application on a handheld device according to the present disclosure.

Likewise, if the operator wishes to view the right portion 456 of the image from the center portion 454 shown in FIG. 1, the operator rotates the trackball 321 to the right. When the trackball 321 is rotated, the image scrolls to the right until the operator terminates actuation of the trackball 321. However, if the operator desires a page-right instruction the operator can actuate the trackball 321 in a rightwardly direction and actuate the secondary input device located to the right of the trackball 321. Additionally, a multiple page right function can be enabled within the application program through multiple contacts with the contact sensitive surface to the right of the trackball 321 after the trackball 321 has been rotated in a rightward direction. In one example, the number of pages that are navigated correspond to the number of contacts with the contact sensitive surface. Furthermore, an right of page function can be enabled when the trackball 321 has been rotated in a rightward direction and a contact to the right of the trackball 321 is made followed by a second contact which is continued for a predetermined amount of time such as two to five seconds.

While the above examples have been given for up, down, left, and right navigation of pages, other configurations could allow for additional directions, such as along the diagonal direction. Additionally, while the actuation and direction of the actuation of the navigation tool and secondary input device have been described in discrete directions, such as up, down, left, and right, the disclosure contemplates that the actuation might not be exactly up, down, left and right. In this case the application program or other program can determine the desired direction of travel based upon the direction of actuation of the navigation tool by the operator as well as the actuation of the secondary input device, where applicable.

Figure 13:
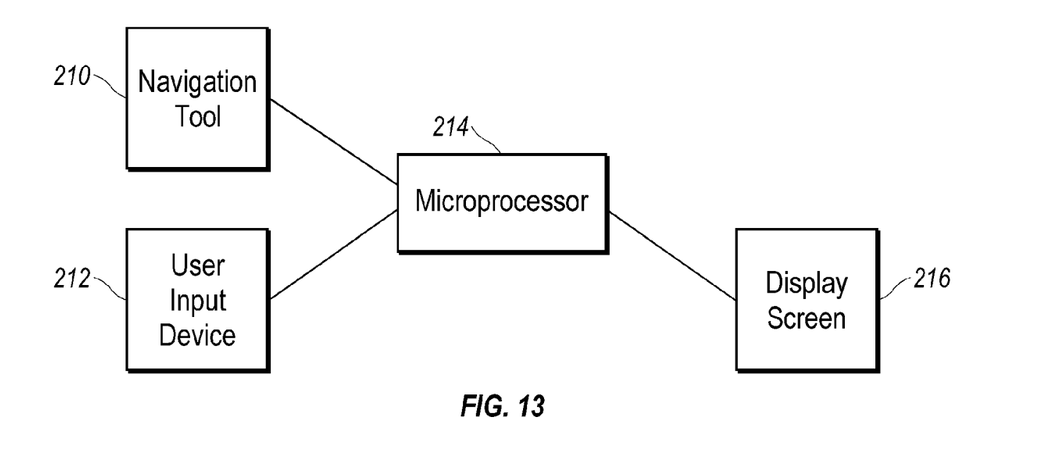
FIG. 13 illustrates a flow diagram of the cooperation of the microprocessor with the navigation tool, secondary user input device; and display screen.

In at least one embodiment, the connection of the navigation tool 210, secondary user input device 212, microprocessor 214 and display screen 216 is illustrated in FIG. 13. In this illustration each of the navigation tool 210, secondary user input device 212 and display screen 216 is in data communication with the microprocessor. Thus, the microprocessor is capable of sending and receiving instructions from each of the navigation tool 210, secondary user input device 212 and display screen 216. When the microprocessor is running an application it is capable of receiving and sending instruction to the navigation tool 210, secondary user input device 212, and display screen 216. The connection between the navigation tool 210, secondary user input device 212, and display screen 216 are illustrated without additionally intermediate components for illustrative purposes.

Figure 14:
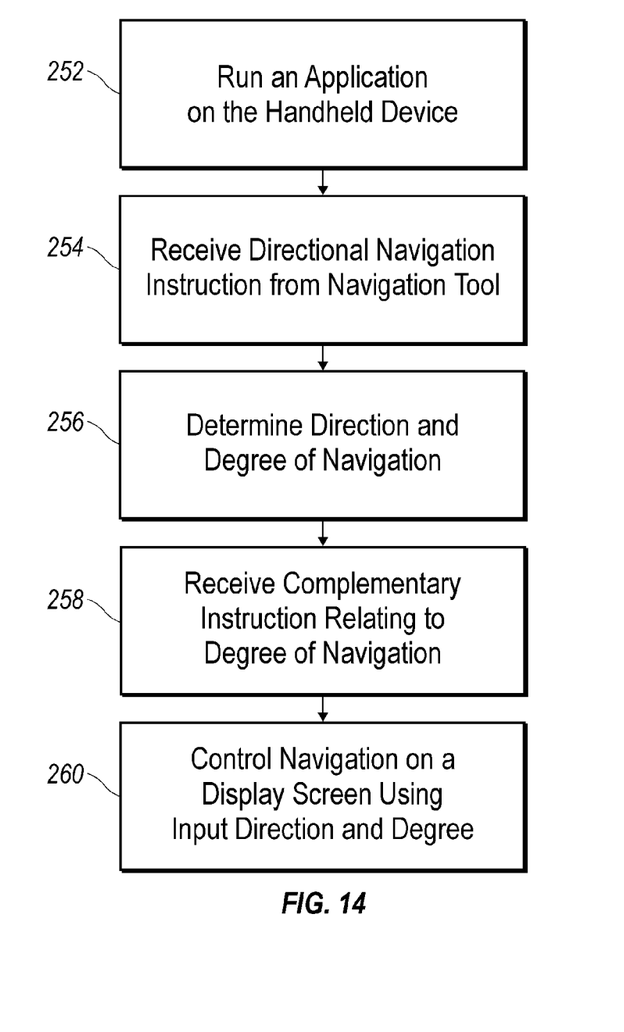
FIG. 14 illustrates an examplary method for enhanced navigation control.

In another embodiment, a method for providing application based navigation enhancement for a handheld electronic device 300 is presented in FIG. 14. The method includes running an application on a microprocessor of a handheld electronic device (block 252) and receiving directional navigation instruction from an operator utilizing a navigation tool (block 254). Further, the method determines a direction and degree of navigation with the application program (block 256). Additionally, the method receives a complimentary instruction that adapts the instructed degree of navigation to be affected in the application program by the received directional navigation instruction (block 258). In at least one embodiment, the method amplifies the degree of navigation within the application program in dependence upon the complimentary instruction. The complimentary instruction can come from the navigation tool or a secondary user input as described above. Thus, the method controls navigation on a display screen using input direction and degree (block 260).

In at least one embodiment, the method receives the complimentary instruction in a direction that is essentially the same direction as the direction received from the navigation tool. Specific examples of instructions that the method is capable of receiving and performing are given below, but the instructions that the method is capable of receiving and performing are not limited to these instructions. In at least one embodiment, the method is capable of receiving an upward instruction from the navigation tool and from the secondary user input device. Once these complimentary instructions are received, the method performs a page-up instruction in response to the upward instructed navigation instruction from the navigation tool and secondary user input device.

Similarly, in at least one embodiment, the method is capable of receiving a downward instruction from the navigation tool and from the secondary user input device. Once these complimentary instructions are received, the method performs a page-down instruction in response to the downward instructed navigation instruction from the navigation tool and secondary user input device.

In yet another embodiment, the method is capable of receiving a rightward instruction from the navigation tool and from the secondary user input device. Once these complimentary instructions are received, the method performs a page-right instruction in response to the rightward instructed navigation instruction from the navigation tool and secondary user input device.

In still another embodiment, the method is capable of receiving a leftward instruction from the navigation tool and from the secondary user input device. Once these complimentary instructions are received, the method performs a page-left instruction in response to the leftward instructed navigation instruction from the navigation tool and secondary user input device.

While the above examples are provided for illustrations, the method can also control the navigation on the application page as described above. Specifically, the method can increase the speed at which navigation on the display screen occurs in response to the received complimentary instruction, whether from the navigation tool or the secondary user input device. Additionally, the speed at which navigation occurs on the display screen can be reduced in response to the received complimentary instruction.

Examplary embodiments have been described hereinabove regarding both handheld wireless communication devices 300, as well as the communication networks 319 within which they operate. Again, it should be appreciated that the focus of the present disclosure is enhancement of navigational operation within an application running on a handheld electronic device 300.

What is claimed is:

1. A handheld electronic device including application navigation enhancement, said device comprising:
   a navigation tool;
   a secondary user input device; and
   a microprocessor electrically coupled to the navigation tool and the secondary user input device, the microprocessor being configured to:
      receive a directional navigation instruction from the navigation tool, said directional navigation instruction indicating a direction and degree of navigation;
      receive a complimentary instruction from the secondary user input device, the complimentary instruction adapted to adjust the instructed degree of navigation received from the navigation tool to perform pre-defined navigation functions; and
      control a navigation icon and an image scrolling operation based on instructions received from the navigation tool and the secondary user input device.

2. The device as recited in claim 1, wherein the complimentary instruction amplifies the instructed degree of navigation.

3. The device as recited in claim 1, wherein the navigation tool is a trackball.

4. The device as recited in claim 3, wherein said secondary user input device is positioned on said device relative said trackball in a direction that is essentially the same as a direction of a received directional navigation instruction.

5. The device as recited in claim 4, wherein said secondary user input device is positioned above said trackball and the direction of the received directional navigation instruction is upward.

6. The device as recited in claim 5, wherein actuation of said secondary user input device subsequent to an upwardly instructed direction of navigation on said trackball initiates a page-up instruction in the program application.

7. A method for providing application based navigation enhancement for a handheld electronic device having a navigation tool and a secondary user input device coupled to a microprocessor, said method comprising:
   running an application program on the microprocessor;
   receiving a directional navigation instruction from the navigation tool;
   determining a navigation direction and degree of navigation within the application program based on the directional navigation instruction;
   receiving a complimentary instruction from the secondary user input device, the complimentary instruction adapted to adjust the instructed degree of navigation received from the navigational tool to perform pre-defined navigation functions; and
   controlling a navigation icon and an image scrolling operation within the application program based on instructions received from the navigation tool and the secondary user input device.

8. The method as recited in claim 7, further comprising amplifying the degree of navigation within the application program.

9. The method as recited in claim 7, further comprising receiving the complimentary instruction in a direction that is essentially the same direction as the direction received from the navigation tool.

10. The method as recited in claim 7, further comprising receiving an upward instructed navigation instruction from said navigation tool and receiving an upward instructed navigation instruction from the secondary user input device.

11. The method as recited in claim 10, further comprising performing a page-up instruction in response to the upward instructed navigation instruction from the navigation tool and secondary user input device.

12. The method as recited in claim 7, further comprising receiving a downward instructed navigation instruction from said navigation tool and receiving a downward instructed navigation instruction from the secondary user input device.

13. The method as recited in claim 12, further comprising performing a page-down instruction in response to the downward instructed navigation instruction from the navigation tool and secondary user input device.

14. The method as recited in claim 7, further comprising receiving a rightward instructed navigation instruction from said navigation tool and receiving a rightward instructed navigation instruction from the secondary user input device.

15. The method as recited in claim 14, further comprising performing a page-right instruction in response to the rightward instructed navigation instruction from the navigation tool and secondary user input device.

16. The method as recited in claim 7, further comprising receiving a leftward instructed navigation instruction from said navigation tool and receiving a leftward instructed navigation instruction from the secondary user input device.

17. The method as recited in claim 16, further comprising performing a page-left instruction in response to the leftward instructed navigation instruction from the navigation tool and secondary user input device.

* * * * *